(12) United States Patent
Takeo

(10) Patent No.: US 10,106,132 B2
(45) Date of Patent: Oct. 23, 2018

(54) ELECTRIC PARKING BRAKE DRIVING DEVICE AND ELECTRIC PARKING BRAKE DEVICE

(71) Applicant: ADVICS CO., LTD., Kariya-shi, Aichi-ken (JP)

(72) Inventor: Yuichi Takeo, Aichi-ken (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/912,746

(22) PCT Filed: Aug. 26, 2014

(86) PCT No.: PCT/JP2014/072269
§ 371 (c)(1),
(2) Date: Feb. 18, 2016

(87) PCT Pub. No.: WO2015/029989
PCT Pub. Date: Mar. 5, 2015

(65) Prior Publication Data
US 2016/0200294 A1    Jul. 14, 2016

(30) Foreign Application Priority Data

Aug. 27, 2013   (JP) .................................. 2013-175119

(51) Int. Cl.
*B60T 7/00*        (2006.01)
*B60T 13/74*       (2006.01)
(Continued)

(52) U.S. Cl.
CPC ................ *B60T 7/00* (2013.01); *B60T 1/065* (2013.01); *B60T 13/74* (2013.01); *B60T 13/741* (2013.01);
(Continued)

(58) Field of Classification Search
CPC ............. F16D 2125/50; F16D 2125/48; F16D 2121/24
See application file for complete search history.

(56) References Cited

U.S. PATENT DOCUMENTS 4,793,447 A * 12/1988 Taig ...................... B60T 13/741
                                                        188/72.1
6,554,109 B1 * 4/2003 Olschewski .............. F15B 7/08
                                                        188/162
(Continued)

FOREIGN PATENT DOCUMENTS

CN        103119319 A     5/2013
JP        2004-308696 A   11/2004
(Continued)

OTHER PUBLICATIONS

International Search Report (PCT/ISA/210) dated Nov. 25, 2014, by the Japanese Patent Office as the International Searching Authority for International Application No. PCT/JP2014/072269.
(Continued)

*Primary Examiner* — Thomas J Williams
*Assistant Examiner* — James K Hsiao
(74) *Attorney, Agent, or Firm* — Buchanan Ingersoll & Rooney PC

(57) ABSTRACT

Provided are a compact, highly reliable electric parking brake driving device and an electric parking brake device. This electric parking brake driving device transmits a driving force generated by an electric motor to a parking brake actuator via a speed reduction mechanism, and makes the wheels generate a braking force. A gear body of the electric parking brake driving device is formed by joining a lower body and an upper body. A bracket member is fixed to the lower body, and the electric motor is positioned in the radial direction by engaging with the bracket member. A rubber disk is placed between the lower end surface of the electric (Continued)

motor and the bottom surface of the lower body, and the rubber disk impels the electric motor toward the bracket member in the direction of the rotation axis.

20 Claims, 4 Drawing Sheets

(51) Int. Cl.
*F16D 65/16* (2006.01)
*B60T 1/06* (2006.01)
*F16H 1/04* (2006.01)
*F16H 1/06* (2006.01)
*F16H 1/28* (2006.01)
*F16D 65/18* (2006.01)
*H02K 7/116* (2006.01)
*H02K 7/14* (2006.01)
*F16D 121/24* (2012.01)
*F16D 125/40* (2012.01)
*F16D 125/48* (2012.01)

(52) U.S. Cl.
CPC ............ *F16D 65/16* (2013.01); *F16D 65/18* (2013.01); *F16H 1/04* (2013.01); *F16H 1/06* (2013.01); *F16H 1/28* (2013.01); *H02K 7/116* (2013.01); *F16D 2121/24* (2013.01); *F16D 2125/40* (2013.01); *F16D 2125/48* (2013.01); *H02K 7/14* (2013.01)

(56) References Cited

U.S. PATENT DOCUMENTS

| | | | |
|---|---|---|---|
| 8,579,090 B2* | 11/2013 | Yamasaki | F16D 65/18 188/162 |
| 2005/0160856 A1* | 7/2005 | Sugitani | F16H 25/2252 74/424.92 |
| 2006/0180413 A1* | 8/2006 | Halasy-Wimmer | B60T 13/741 188/158 |
| 2007/0049453 A1* | 3/2007 | Nagai | F16H 61/0295 475/254 |
| 2008/0159667 A1* | 7/2008 | Michioka | F16C 31/02 384/13 |
| 2009/0050420 A1* | 2/2009 | Poertzgen | B60T 13/746 188/156 |
| 2009/0095579 A1* | 4/2009 | Yamasaki | F16D 65/18 188/72.7 |
| 2010/0038191 A1* | 2/2010 | Culbertson | F16D 55/226 188/72.6 |
| 2010/0108450 A1* | 5/2010 | Suckfull | B29C 45/1671 188/196 R |
| 2010/0320041 A1* | 12/2010 | Seuser | B60T 13/746 188/162 |
| 2010/0320043 A1* | 12/2010 | Yamasaki | F16D 65/18 188/162 |
| 2012/0325601 A1* | 12/2012 | Giering | F16D 65/0006 188/162 |
| 2013/0168192 A1* | 7/2013 | Yasui | F16D 65/18 188/72.1 |
| 2013/0180811 A1* | 7/2013 | Poertzgen | B60T 13/741 188/156 |
| 2013/0203554 A1* | 8/2013 | Dettenberger | F16D 65/28 475/343 |
| 2014/0041975 A1* | 2/2014 | Takewaki | F16D 65/18 188/361 |

FOREIGN PATENT DOCUMENTS

| | | |
|---|---|---|
| JP | 2008-017568 A | 1/2008 |
| JP | 2008-29175 A | 2/2008 |
| JP | 2012-34532 A | 2/2012 |
| JP | 2012-229741 A | 11/2012 |
| JP | 2013-155650 A | 8/2013 |
| WO | WO 2007/096098 A1 | 8/2007 |

OTHER PUBLICATIONS

Written Opinion (PCT/ISA/237) dated Nov. 25, 2014, by the Japanese Patent Office as the International Searching Authority for International Application No. PCT/JP2014/072269.

* cited by examiner

ELECTRIC PARKING BRAKE DRIVING DEVICE AND ELECTRIC PARKING BRAKE DEVICE

TECHNICAL FIELD

The present invention relates to an electric parking brake driving device which is driven by an electric motor at parking a vehicle and imparts a braking force to a wheel, and to an electric parking brake device.

BACKGROUND ART

Conventionally, an electric brake device is mounted on a wheel, and imparts a braking force to the wheel by operating an electric motor (for example, see Patent Literature 1). The electric brake device disclosed in Patent Literature 1 includes a small-diameter pulley fixed to an output shaft of the electric motor, and a large-diameter pulley rotatably provided in a housing, in which a belt is entrained between the large-diameter pulley and the small-diameter pulley. Planetary gears in two stages are coaxially connected to the large-diameter pulley, thereby forming a gear mechanism together with the large-diameter pulley.

With this, a driving force generated by the electric motor is speed-reduced by the transmission mechanism including the belt and the planetary gears, is converted to a pressing force in the linear direction, and is transmitted to the wheel brake, thereby imparting a braking force to the wheel.

In the electric brake device described in Patent Literature 1, a bracket is mounted at one end of the electric motor in the direction of the rotation axis, and the electric motor is mounted in the housing via the bracket. When the electric motor is mounted in the housing, an elastic body is arranged between the bracket and an inner peripheral surface of the housing, and the elastic body is arranged between the other end of the electric motor and the housing.

With this, the electric brake device disclosed in Patent Literature 1 can absorb variation in the dimension of the housing and each member housed in the housing, and can reduce an impact caused in the driving device due to wheel vibration.

CITATIONS LIST

Patent Literature

Patent Literature 1: WO2007/096098

SUMMARY OF INVENTION

Technical Problems

The housing of the electric brake device disclosed in Patent Literature 1 is formed by joining a pair of bodies. When fastening bolts are used to join the bodies, the housing is increased in size due to the fastening allowance. Thus, typically, the bodies are often joined by welding in which no fastening allowance is required.

However, in the conventional electric brake device described above, the electric motor is sandwiched between the two bodies in case where the housing joined by welding is used, with the result that both bodies receive a load in the direction separating the bodies from each other by the impelling force of the elastic body arranged between both ends of the electric motor. The load applied to the bodies may act on the welding portion of the housing to reduce the joining force. The reduced joining force of the welding portion causes rattling in each member in the housing and engaging failure in the gears due to the ratting, resulting in reduction in the reliability of the electric brake device.

The present invention has been made in view of the above circumstances, and an object of the present invention is to provide a compact, highly reliable electric parking brake driving device and an electric parking brake device.

Solutions to Problems

To solve the above problems, the configuration of an invention of a first aspect provides an electric parking brake driving device for driving a parking brake actuator in which rotation motion of a rotating member is converted to linear motion to transmit the linear motion to a moving member and a brake pad impelled by the moving member presses a disk rotated together with a wheel to generate a braking force on the wheel, including a gear body formed by joining a first piece and a second piece, a mounting member fixed on an inner periphery of the first piece, an electric motor positioned in the gear body in a predetermined direction by engaging or being integrated with the mounting member, a pressing member arranged between an inner peripheral surface of the first piece and the electric motor and impelling the electric motor toward the mounting member, and a speed reduction mechanism housed in the gear body and transmitting a driving force generated by the electric motor to the rotating member.

In the configuration of an invention of a second aspect, in the electric parking brake driving device of the first aspect, the speed reduction mechanism includes a driving gear fixed to an output shaft of the electric motor, a first gear shaft positioned in the predetermined direction by engaging with the mounting member and mounted in the gear body, and a first driven gear formed on the first gear shaft, having more teeth than the driving gear, engaging with the driving gear, and connected to the rotating member, so that the first driven gear transmits the rotation of the electric motor while reducing the speed thereof to the rotating member.

In the configuration of an invention of a third aspect, in the electric parking brake driving device of the second aspect, the electric motor has a motor housing, a fitting portion projecting from one end surface of the motor housing in the direction of the rotation axis, the output shaft projecting in the axial direction from an projecting end surface of the fitting portion, the mounting member is arranged so as to face the one end surface of the motor housing and has a positioning hole, the positioning hole being fitted to an outer circumferential surface of the fitting portion, so that the electric motor being positioned relative to the mounting member in the radial direction, and the pressing member impels an other end surface of the motor housing toward the mounting member to abut the one end surface on the mounting member.

In the configuration of an invention of a fourth aspect, in the electric parking brake driving device of the third aspect, an elastic body holding portion projects from the other end surface of the motor housing, and the pressing member is formed of a rubber material in a disk shape having a holding hole at a center thereof, and is arranged between the inner peripheral surface of the first piece and the other end surface of the motor housing so that the elastic body holding portion is fitted in the holding hole.

In the configuration of an invention of a fifth aspect, in the electric parking brake driving device of the second to fourth aspects, the speed reduction mechanism has a transmission gear provided on the first gear shaft and rotated integrally with the first driven gear, a second gear shaft mounted in the gear body, a second driven gear formed on the second gear shaft, having more teeth than the transmission gear, and engaging with the transmission gear, a sun gear provided on the second gear shaft and rotated integrally with the second driven gear, a plurality of planetary gears engaging with the sun gear and revolving around an outer circumference of the sun gear by rotation of the sun gear, a ring gear arranged around the planetary gears, engaging with the planetary gears on an inner circumferential surface thereof, and being unrotatable by engaging with the gear body, and a carrier member connecting the planetary gears, connected to the rotating member, and rotated by revolution of the planetary gears, so that the carrier member transmits the rotation of the sun gear while reducing the speed thereof to the rotating member.

The configuration of an invention of a sixth aspect provides an electric parking brake device including a brake housing mounted on a vehicle body, a moving member mounted in the brake housing so as to be movable in the axial direction and to be unrotatable, a brake pad arranged between a disk rotated together with a wheel and the moving member, a gear body formed by joining a first piece and a second piece and mounted to the brake housing, an electric motor mounted in the gear body, a speed reduction mechanism housed in the gear body and transmitting a driving force generated by the electric motor, and a rotating member engaging with the moving member, driven by the electric motor via the speed reduction mechanism to move the moving member in the axial direction, and impelling the brake pad toward the disk via the moving member, in which the mounting member is fixed on an inner periphery of the first piece, in which the electric motor is positioned in the gear body in a predetermined direction by engaging or being integrated with the mounting member, and in which the pressing member is arranged between an inner peripheral surface of the first piece and the electric motor, and impels the electric motor toward the mounting member.

Advantageous Effects of Invention

The electric parking brake driving device of the first aspect includes the mounting member fixed on the inner periphery of the first piece, the electric motor positioned in the gear body in the predetermined direction by engaging or being integrated with the mounting member, and the pressing member arranged between the inner peripheral surface of the first piece and the electric motor and impelling the electric motor toward the mounting member, so that the electric motor can be fixed in the gear body without being rattled.

In addition, an impelling force of the pressing member acts between the inner peripheral surface of the first piece and the mounting member fixed on the first piece, so that no load separating the first piece and the second piece is caused, and the joining force in the joining portion of both can be prevented from lowering.

In the electric parking brake driving device of the second aspect, the speed reduction mechanism includes the driving gear fixed to the output shaft of the electric motor, the first gear shaft positioned in the predetermined direction by engaging with the mounting member and mounted in the gear body, and the first driven gear formed on the first gear shaft, having more teeth than the driving gear, engaging with the driving gear, and connected to the rotating member, so that the first driven gear transmits the rotation of the electric motor while reducing the speed thereof to the rotating member, so that both the electric motor and the first gear shaft are positioned on the mounting member, and variation in the dimension between the output shaft of the electric motor and the first gear shaft depends only on the manufacturing error in the mounting member. Thus, variation in the dimension between both can be reduced, and abnormal sound and lowering of the transmission efficiency at operating the speed reduction mechanism can be prevented.

In addition, the dimension accuracy between the output shaft of the electric motor and the first gear shaft can be improved, so that backlash adjustment between the driving gear and the first driven gear at manufacturing the speed reduction mechanism can be unnecessary.

In the electric parking brake driving device of the third aspect, the mounting member is arranged so as to face the one end surface of the motor housing and has the positioning hole, the positioning hole being fitted to the outer circumferential surface of the fitting portion from which the output shaft of the electric motor projects, the electric motor being positioned relative to the mounting member in the radial direction, so that the position accuracy of the output shaft relative to the first gear shaft can be more improved on the mounting member, and variation in the dimension between both can be further reduced.

In addition, the pressing member impels the other end surface of the motor housing toward the mounting member to make the one end surface of the motor housing abut on the mounting member, so that the electric motor can be stably mounted in the gear body without being rattled.

In the electric parking brake driving device of the fourth aspect, the elastic body holding portion projects from the other end surface of the motor housing, the pressing member is formed of a rubber material in a disk shape having the holding hole at the center thereof, and is arranged between the inner peripheral surface of the first piece and the other end surface of the motor housing so that the elastic body holding portion is fitted in the holding hole, so that the pressing member can be prevented from being misaligned in the gear body, and the electric motor can be stably impelled toward the mounting member.

In the electric parking brake driving device of the fifth aspect, the speed reduction mechanism has the transmission gear provided on the first gear shaft and rotated integrally with the first driven gear, the second gear shaft mounted in the gear body, the second driven gear formed on the second gear shaft, having more teeth than the transmission gear, and engaging with the transmission gear, the sun gear provided on the second gear shaft and rotated integrally with the second driven gear, the plurality of planetary gears engaging with the sun gear and revolving around the outer circumference of the sun gear by rotation of the sun gear, the ring gear arranged around the planetary gears, engaging with the planetary gears on the inner circumferential surface thereof, and being unrotatable by engaging with the gear body, and the carrier member connecting the planetary gears, connected to the rotating member, and rotated by revolution of the planetary gears, so that the carrier member transmits the rotation of the sun gear while reducing the speed thereof to the rotating member, so that the rotation of the electric motor is speed-reduced by the two-stage gear mechanism and the planetary gear mechanism, and the electric parking brake driving device can be compact and have a great speed reduction effect.

In the electric parking brake driving device of the sixth aspect, the mounting member is fixed on the inner periphery of the first piece, the electric motor is positioned in the gear body in the predetermined direction by engaging or being integrated with the mounting member, and the pressing member is arranged between the inner peripheral surface of the first piece and the electric motor, and impels the electric motor toward the mounting member, so that the electric motor can be fixed to the gear body without being rattled.

In addition, the impelling force of the pressing member acts between the inner peripheral surface of the first piece and the mounting member fixed on the first piece, so that no load separating the first piece and the second piece is caused, and the joining force in the joining portion of both can be prevented from being lowered.

DESCRIPTION OF EMBODIMENTS

Figure 1:
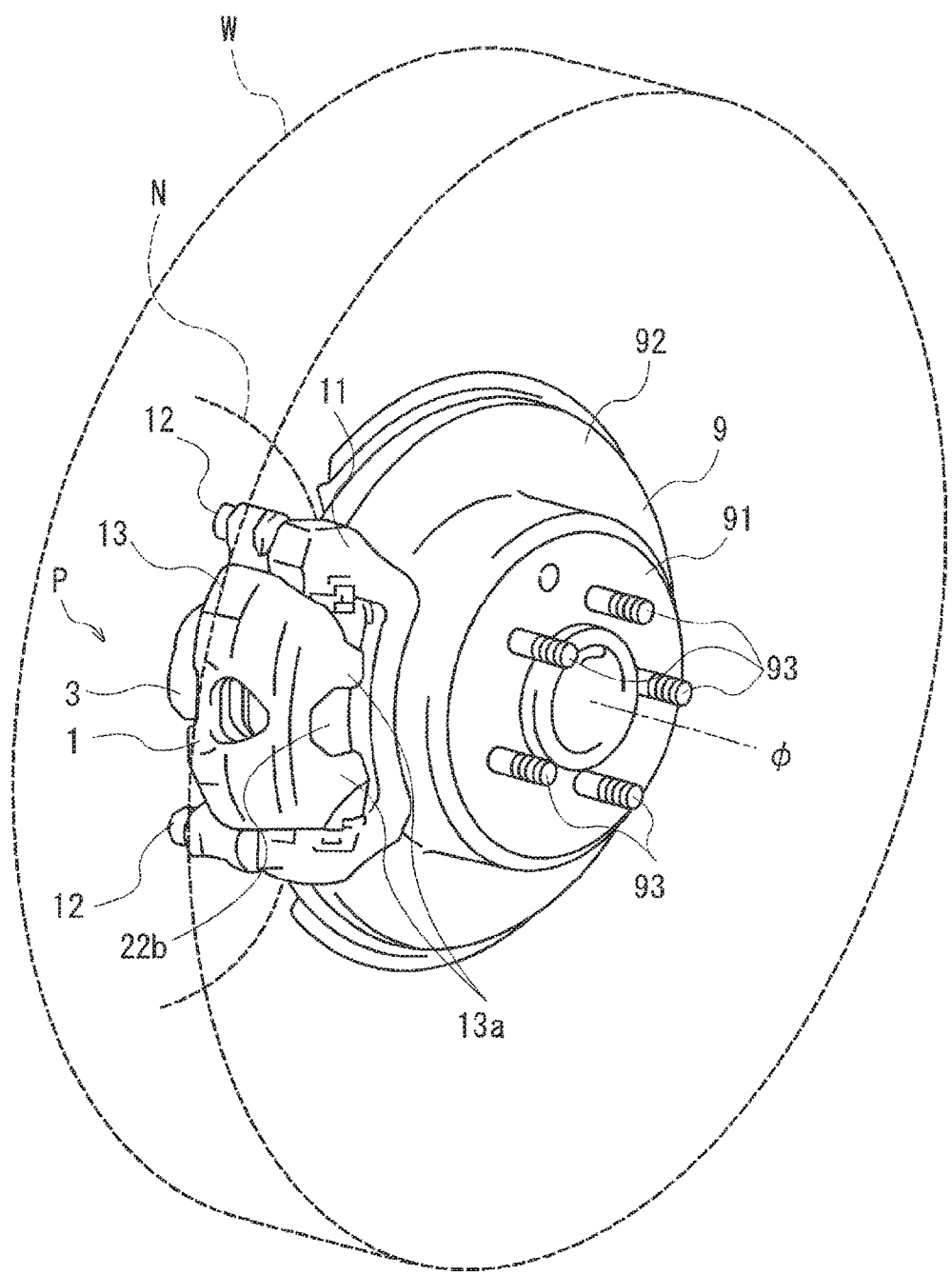
FIG. 1 is an appearance perspective view of an electric parking brake device according to an embodiment of the present invention mounted on a wheel.
Figure 2:
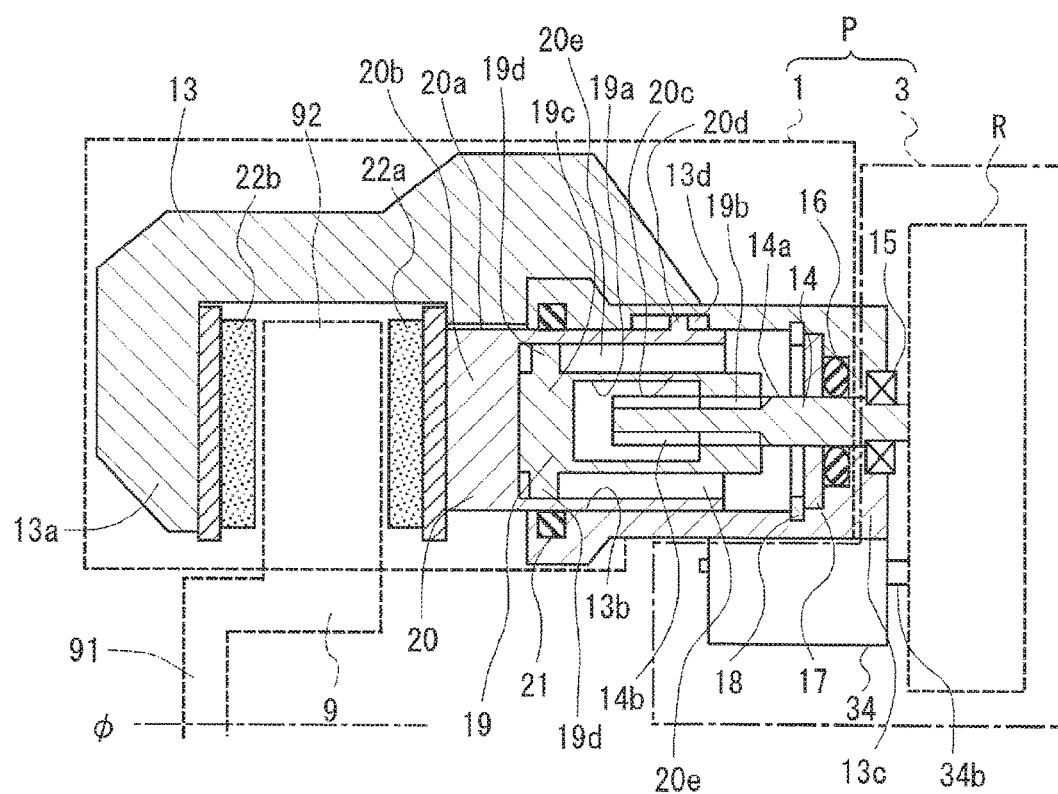
FIG. 2 is a schematic cross-sectional view of the electric parking brake device illustrated in FIG. 1 cut in the direction of the rotation axis of a disk rotor.

Referring to FIGS. 1 to 5, an electric parking brake device P according to an embodiment of the present invention will be described. The electric parking brake device P according to this embodiment is formed of a parking brake actuator 1 and an electric parking brake driving device 3, and also serves as a foot brake device in which a driver operates a brake operating member while driving a vehicle, thereby imparting a braking force to a wheel. FIG. 2 is a schematic cross-sectional view of the electric parking brake device P, and does not exactly illustrate its actual cross-sectional shape.

A disk rotor 9 (corresponding to a disk) which is out of the configuration of the present invention has a hat 91 projecting to the outside of the vehicle at a center of rotation thereof, and a plate 92 formed around the hat 91 and sandwichably pressed by a first brake pad 22a and a second brake pad 22b, as described later.

As illustrated in FIG. 1, a plurality of stud bolts 93 project from an end surface of the hat 91. The disk rotor 9 is mounted on a disk wheel of wheel W by using the stud bolts 93, and is thus integrally rotatable with a wheel W.

A mounting 11 of the electric parking brake device P is mounted and fixed on a knuckle arm N (corresponding to a vehicle body) of the vehicle. The first brake pad 22a and the second brake pad 22b are held on the mounting 11 (in FIG. 1, only the second brake pad 22b is illustrated). The first brake pad 22a is arranged between the disk rotor 9 and a piston 20 described later.

A brake housing 13 is mounted on the mounting 11 so as to be movable in the direction of the rotation axis φ of the disk rotor 9 (hereinafter, simply called the direction of the rotation axis φ) via a pair of slide pins 12. The brake housing 13 is formed of substantially U-shaped cross section so as to straddle the plate 92 of the disk rotor 9 (FIGS. 1 and 2). In addition, a pair of pawls 13a for pressing the second brake pad 22b is formed in the brake housing 13.

As illustrated in FIG. 2, the electric parking brake driving device 3 including an electric motor 34 and a speed reduction mechanism R is mounted to the brake housing 13. The electric parking brake driving device 3 will be described later.

A cylinder 13b is formed in the brake housing 13. A screw member 14 (corresponding to a rotating member) is provided to project into the cylinder 13b. The screw member 14 extending in the direction of the rotation axis φ is rotatably mounted at a bottom 13c of the cylinder 13b via a bearing 15. A seal member 16 formed of a synthetic resin material or a synthetic rubber material is arranged between an outer circumferential surface 14a of the screw member 14 and the bottom 13c.

To prevent the seal member 16 from moving in the direction of the rotation axis φ, a holding plate 17 is arranged at the bottom 13c of the cylinder 13b. Further, a snap ring 18 preventing come-off of the holding plate 17 is mounted on an inner circumferential surface of the cylinder 13b.

A nut member 19 is provided in the cylinder 13b so as to be located radially outer side of the screw member 14. The nut member 19 takes on a substantially cylindrical shape, and has a female screw 19b formed at an end of an inner circumferential surface 19a in the axial direction. The female screw 19b of the nut member 19 is threadedly engaged with a male screw 14b formed on the outer circumferential surface 14a of the screw member 14. In addition, at an end 19c on the other side of the nut member 19, a plurality of engaging portions 19d extend radially outwardly from the outer circumferential surface thereof.

The piston 20 is fitted on the cylinder 13b so as to be movable in the direction of the rotation axis φ. In addition, a piston seal 21 is mounted on the cylinder 13b so as to engage with an outer circumferential surface 20a of the piston 20. The piston seal 21 seals an interior of the cylinder 13b from the outside in liquid tight manner together with the seal member 16.

The piston 20 is formed in a substantially cylindrical shape, and is closed at one end by an end wall 20b which can abut on the first brake pad 22a. The nut member 19 engages with an inner circumferential surface 20c of the piston 20 so as to be relatively movable in the direction of the rotation axis φ. In addition, a projection 20d is formed on the outer circumferential surface 20a of the piston 20, and a slit 13d is formed in the cylinder 13b so as to extend in the direction of the rotation axis φ. The projection 20d of the piston 20 engages with the slit 13d, so that the piston 20 is formed so as to be unrotatable relative to the cylinder 13b.

A plurality of sliding grooves 20e extending in the direction of the rotation axis φ are formed on the inner circumferential surface 20c of the piston 20, and the engaging portions 19d of the nut member 19 are inserted into the sliding grooves 20e. Thus, the nut member 19 is unrotatable relative to the piston 20, and is also unrotatable relative to the cylinder 13b via the piston 20. The configuration including the piston 20 and the nut member 19 corresponds to a moving member.

The screw member 14 is formed so as to be rotatable by the electric motor 34 via the speed reduction mechanism R. When the screw member 14 is rotated at parking the vehicle, the unrotatable nut member 19 moves in the piston 20 toward the disk rotor 9 in the direction of the rotation axis φ (leftward in FIG. 2). The end 19c of the nut member 19 presses the piston 20, and impels the first brake pad 22a toward the disk rotor 9 via the piston 20.

A reaction force generated in the first brake pad 22a acts on the brake housing 13 via the piston 20, the nut member 19, the screw member 14, and the speed reduction mechanism R, and impels the brake housing 13 in the opposite direction of the piston 20 (rightward in FIG. 2). With this, the brake housing 13 moves in the direction of the rotation axis φ, and the pawls 13a impel the second brake pad 22b toward the disk rotor 9. Thus, the disk rotor 9 is sandwichably pressed by the first brake pad 22a and the second brake pad 22b, thereby imparting a braking force to wheel W.

At releasing the braking force to the disk rotor 9, the electric motor 34 is rotated reversely to move the nut member 19 rightward in FIG. 2, thereby stopping the pressing of the piston 20 to the first brake pad 22a. With this, the reaction force generated in the first brake pad 22a disappears so that the pawls 13a of the brake housing 13 do not press the second brake pad 22b, thereby releasing the braking force to wheel W.

When the driver brakes to speed-reduce the vehicle in driving the vehicle, a brake hydraulic pressure discharged from a master cylinder (not illustrated) is supplied through a brake piping (not illustrated) into the cylinder 13b. The brake hydraulic pressure supplied into the cylinder 13b presses the piston 20 in the direction of the rotation axis φ (leftward in FIG. 2) while the piston 20 is separated from the nut member 19, and impels the first brake pad 22a toward the disk rotor 9.

The mounting 11, the slide pins 12, the brake housing 13, the first brake pad 22a, the second brake pad 22b, the screw member 14, the nut member 19, and the piston 20 configure the parking brake actuator 1.

Figure 3:
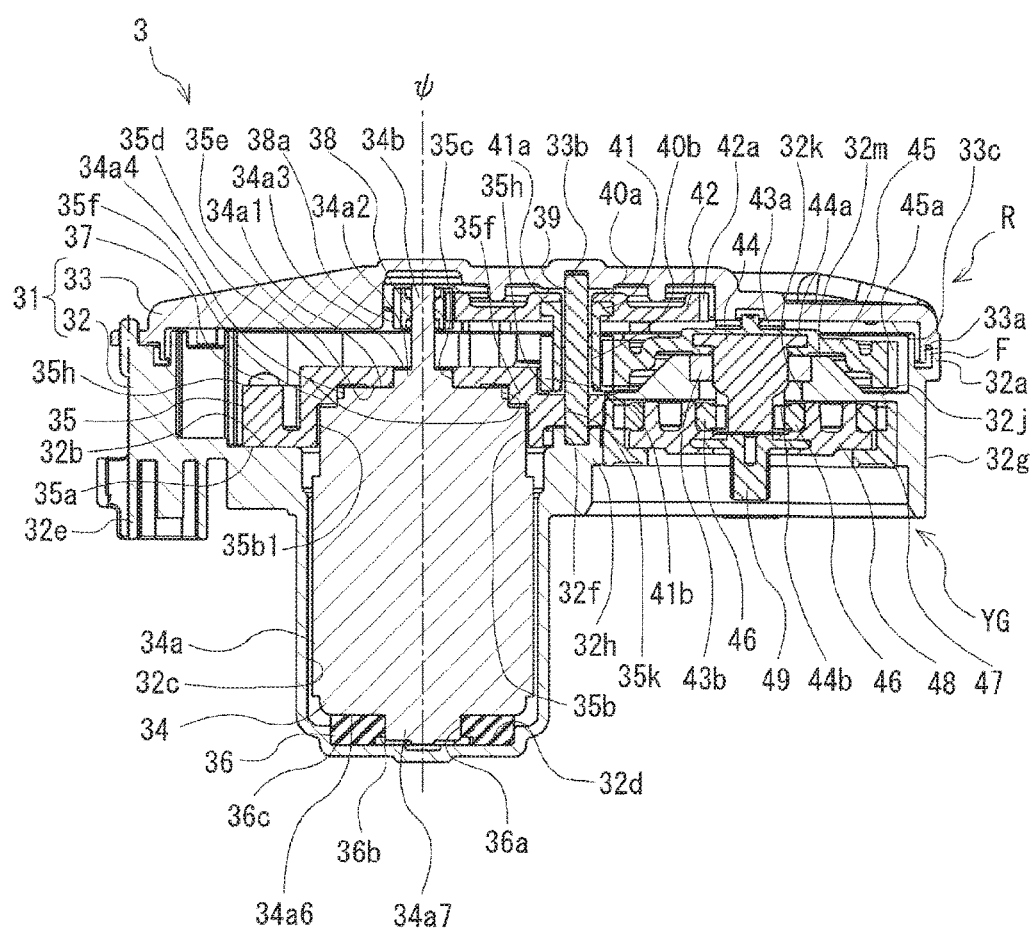
FIG. 3 is a cross-sectional view of an electric parking brake driving device illustrated in FIG. 2 cut in the axial direction of an output shaft of an electric motor.
Figure 4:
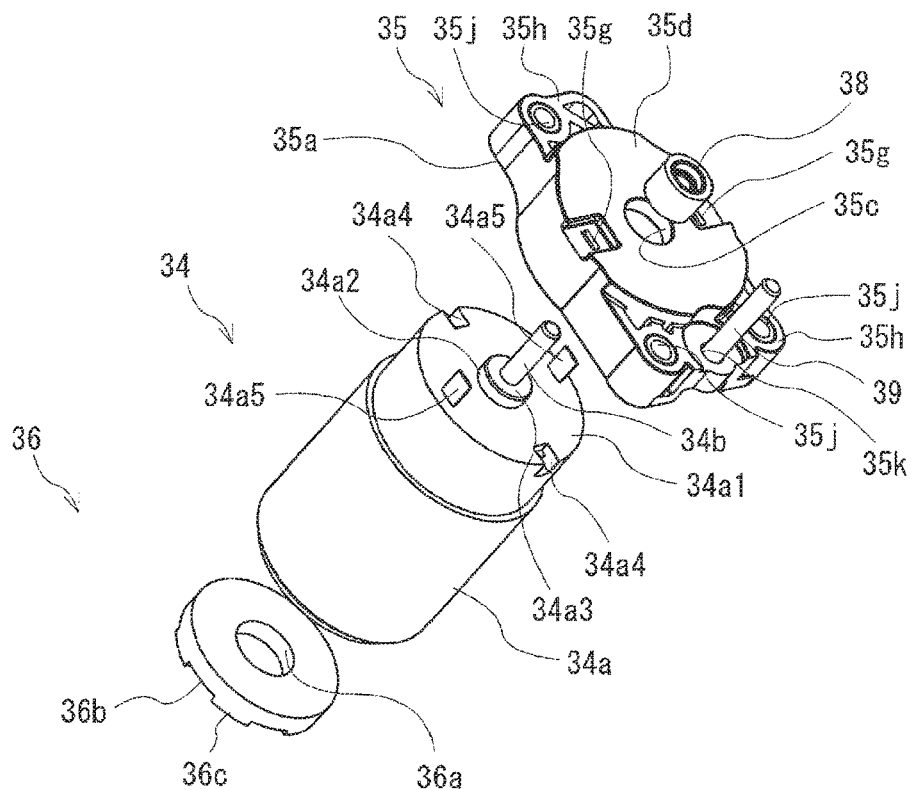
FIG. 4 is an exploded perspective view of a bracket member, the electric motor, and a rubber disk of the electric parking brake driving device seen from the bracket member side.
Figure 5:
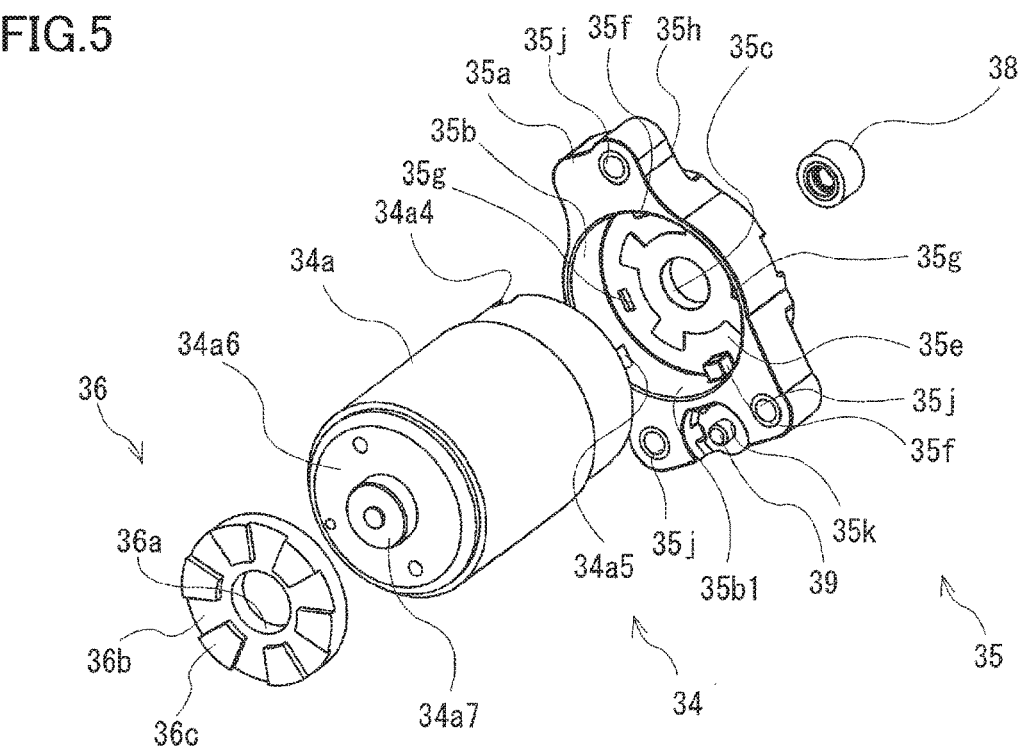
FIG. 5 is an exploded perspective view of the configuration illustrated in FIG. 4 seen from the rubber disk side.

Referring to FIGS. 3 to 5, the electric parking brake driving device 3 (hereinafter, called the driving device 3) which drives the parking brake actuator 1 will be described in detail. The upper side in FIG. 3 is the upper side of the driving device 3, and the lower side in FIG. 3 is the lower side of the driving device 3.

The driving device 3 is formed of a gear body 31, the electric motor 34, a bracket member 35, a rubber disk 36, screws 37, and speed reduction mechanism R. The gear body 31 of the driving device 3 is formed by joining a lower body 32 (corresponding to a first piece) and an upper body 33 (corresponding to a second piece), which are integrally formed of a synthetic resin material so as to have a space with a predetermined capacity therein. The gear body 31 is fixed to the brake housing 13.

A surrounding wall 32a extending in the direction of the rotation axis φ of the electric motor 34 (which is the up-down direction in FIG. 3, is the same direction as the rotation axis φ of the disk rotor 9, and hereinafter, is simply called the direction of the rotation axis φ) is formed throughout an outer peripheral edge of the lower body 32. A facing portion 33a of substantially L-shaped cross section is formed throughout an outer peripheral edge of the upper body 33.

In this embodiment, when the lower body 32 and the upper body 33 are joined, first, their outer peripheral edges face each other, and the surrounding wall 32a and the facing portion 33a abut on each other to position both. Next, an adhesive is filled into an application space (indicated by F in FIG. 3) surrounded by the surrounding wall 32a and the facing portion 33a. Then, by solidifying the adhesive, the lower body 32 and the upper body 33 are joined throughout their outer peripheral edges. By the adhesive, the lower body 32 and the upper body 33 are joined in liquid tight manner so as to prevent water or the like from intruding from the outside.

As illustrated in FIGS. 3 to 5, a motor housing 34a of the electric motor 34 takes on a substantially cylindrical shape, and a shaft projection 34a2 (corresponding to a fitting portion) projects upward from an upper end surface 34a1 (corresponding to one end surface). The shaft projection 34a2 is cylindrically formed at a center of the upper end surface 34a1. An output shaft 34b (corresponding to an output shaft) projects from a projecting end surface 34a3.

A pair of motor slits 34a4 are formed on the upper end surface 34a1 of the motor housing 34a so as to be opposite on a circumference thereof and to cut away a circumferential edge thereof. Further, a pair of engaging pieces 34a5 extend perpendicularly from the upper end surface 34a1 (FIG. 4).

A disk holder 34a7 (corresponding to an elastic body holding portion) projects downward from a lower end surface 34a6 (corresponding to the other end surface) of the motor housing 34a (FIG. 5). The disk holder 34a7 projects in a cylindrical shape at the center of the lower end surface 34a6.

As illustrated in FIGS. 4 and 5, the bracket member 35 (corresponding to a mounting member) is formed of a synthetic resin material in a substantially planar shape. At a center of a lower end surface 35a of the bracket member 35, a recess 35b having an inner circumferential surface 35b1 in a perfect circular shape is formed (FIG. 5). A supporting hole 35c (corresponding to a positioning hole) in a perfect circular shape is formed above the recess 35b, and is opened to an upper end surface 35d of the bracket member 35. The supporting hole 35c has an inside diameter dimension which can be fitted to the shaft projection 34a2 of the electric motor 34.

A pair of engaging projections 35f project downward from a ceiling surface 35e of the recess 35b. A pair of insertion slots 35g penetrate upward from the ceiling surface 35e (FIG. 5).

A plurality of mounting surfaces 35h are formed around the upper end surface 35d so as to be lower by one stage than the upper end surface 35d. Three screw holes 35j penetrating to the lower end surface 35a are formed in the mounting surfaces 35h. A pin holding hole 35k penetrates in the mounting surface 35h (FIGS. 4 and 5).

The rubber disk 36 (corresponding to a pressing member) is integrally formed of a synthetic rubber material, such as butyl rubber, acrylic rubber, and EPDM, and has an elastic force. The rubber disk 36 is formed in a substantially disk shape because a motor engaging hole 36a (corresponding to a holding hole) in a perfect circular shape penetrates through the center thereof in the thickness direction. The motor engaging hole 36a has an inside diameter dimension which can be fitted to the disk holder 34a7 of the electric motor 34. The motor engaging hole 36a is not always required to penetrate through the rubber disk 36, and may be formed in a bag shape on the rubber disk 36.

A plurality of abutting portions 36c are formed on a lower surface 36b of the rubber disk 36 so as to be aligned with spacing on a circumference thereof. The abutting portions 36c are formed in order to stabilize the pressing force characteristic imparted by the rubber disk 36 to the electric motor 34, and project downward by one stage from the lower surface 36b (FIG. 5).

As illustrated in FIG. 3, the bracket member 35 is fixed on the lower body 32 in a state where the lower end surface 35a abuts on an inner peripheral surface 32b (corresponding to an inner periphery) of the lower body 32. The bracket member 35 is fixed on the lower body 32 by threading the screws 37 (only one is illustrated in FIG. 3) inserted through the screw holes 35j into the lower body 32.

The electric motor 34 is housed in a motor storing portion 32c formed in a shape deepened from the lower body 32, and the upper end surface 34a1 of the electric motor 34 is arranged so as to face the bracket member 35. The electric motor 34 is positioned in the gear body 31 in the radial direction relative to the rotation axis ϕ (which is the horizontal direction in FIG. 3, and corresponds to a predetermined direction) by fitting the shaft projection 34a2 in the supporting hole 35c. At this time, the motor slits 34a4 of the motor housing 34a are fitted to the engaging projections 35f of the bracket member 35, and the engaging pieces 34a5 of the motor housing 34a engage with the insertion slots 35g of the bracket member 35, thereby whirl-stopping the electric motor 34. A small space is formed between an outer circumferential surface of the motor housing 34a and the inner circumferential surface 35b1 of the bracket member 35 (FIG. 3).

The rubber disk 36 is arranged between the lower end surface 34a6 of the motor housing 34 and a bottom surface 32d of the motor storing portion 32c. By fitting the disk holder 34a7 of the motor housing 34a in the motor engaging hole 36a, the rubber disk 36 is sandwiched between the disk holder 34a7 and the lower body 32, and is positioned in the radial direction (FIG. 3).

The rubber disk 36 presses the lower end surface 34a6 of the electric motor 34 toward the bracket member 35 in the direction of the rotation axis ϕ (upward in FIG. 3) since the abutting portions 36c are compressed in the thickness direction by the electric motor 34 and the lower body 32 to generate an impelling force. Thus, the electric motor 34 is mounted in the gear body 31 in a state where the upper end surface 34a1 of the motor housing 34a abuts on the ceiling surface 35e of the bracket member 35, and a gap is formed between the disk holder 34a7 of the motor housing 34a and the bottom surface 32d of the lower body 32 (FIG. 3).

As illustrated in FIG. 3, a power source connector 32e for connecting an external connector (not illustrated) is formed at an end of the lower body 32. A power supply line (not illustrated) connected from the power source connector 32e to the electric motor 34 is inserted into the lower body 32.

The speed reduction mechanism R according to this embodiment will be described. The speed reduction mechanism R is housed in the gear body 31, and speed-reduces a driving force generated by the electric motor 34 to transmit the speed-reduced driving force to the screw member 14. A pinion gear 38 (corresponding to a driving gear) having helical teeth 38a on an outer circumferential surface thereof is press-fitted and fixed to the output shaft 34b of the electric motor 34.

A pivot pin 39 (corresponding to a first gear shaft) is fixed into the pin holding hole 35k of the bracket member 35 by press fitting or insert molding. The pivot pin 39 has a lower end fitted in a pin fixing hole 32f of the lower body 32, and an upper end fitted in a pin holding hole 33b of the upper body 33. Both ends of the pivot pin 39 may be press-fitted or insert-molded to the lower body 32 and the upper body 33.

A gear member 41 is rotatably mounted on the pivot pin 39 via a pair of bushes 40a, 40b. A first collar 41a projecting in the radial direction is formed on the upper side of the gear member 41. A first wheel gear 42 (corresponding to a first driven gear) is fixed to the first collar 41a by insert molding. As described later, the first wheel gear 42 is connected to the screw member 14 via a plurality of members.

The first wheel gear 42 is a helical gear formed of a synthetic resin material, and has helical teeth 42a on an outer circumferential surface thereof. The first wheel gear 42 engages with the helical teeth 38a of the pinion gear 38. The first wheel gear 42 is formed so as to have a larger diameter than the pinion gear 38. The number of the helical teeth 42a of the first wheel gear 42 is larger than the number of the helical teeth 38a of the pinion gear 38.

A gear 41b (corresponding to a transmission gear) is integrally formed on an outer circumferential surface of the gear member 41 on the lower side. Like the pinion gear 38, the gear 41b is formed of helical teeth, and is integrally rotated with the first wheel gear 42.

An upper bearing member 43a is mounted on an upper surface 33c of the upper body 33.

A bearing fixing surface 32j extends in the horizontal direction in FIG. 3 from an outer peripheral wall 32g and a motor wall 32h of the lower body 32. The bearing fixing surface 32j extends toward a center of rotation of a gear shaft 44, and partitions a planetary gear 46 and a second wheel gear 45.

The bearing fixing surface 32j is formed so as to have an outer shape in a perfect circular shape. At a center of the bearing fixing surface 32j, the supporting hole 32k penetrates therethrough, and a boss 32m extending in the up-down direction is provided. A lower bearing member 43b is mounted on the boss 32m. The upper bearing member 43a and the lower bearing member 43b are formed of a metal material, and are fixed to the upper body 33 or the lower body 32 by insert molding or induction heating welding.

The gear shaft 44 (corresponding to a second gear shaft) made of a metal material is rotatably supported on the lower bearing member 43b. A second collar 44a projecting in the radial direction is formed on the upper side of the gear shaft 44. The second wheel gear 45 (corresponding to a second driven gear) is fixed to the second collar 44a by insert molding. The gear shaft 44 is rotatably supported on the upper bearing member 43a via the second wheel gear 45 (FIG. 3).

The second wheel gear 45 is a helical gear formed of a synthetic resin material like the first wheel gear 42, and has helical teeth 45a on an outer circumferential surface thereof. The second wheel gear 45 engages with the gear 41b of the gear member 41. The second wheel gear 45 is formed so as to have a larger diameter than the gear 41b. The number of the helical teeth 45a of the second wheel gear 45 is formed so as to be larger than the number of teeth of the gear 41b.

A sun gear 44b (corresponding to a sun gear) is integrally formed at the lower end of the gear shaft 44. The sun gear 44b is rotated integrally with the second wheel gear 45.

A plurality of the planetary gears 46 are arranged around and engage with the sun gear 44b. In this embodiment, four planetary gears 46 are provided (only two are illustrated in FIG. 3), but the present invention is not limited to this. Each planetary gear 46 is formed of a metal material, and revolves around an outer circumference of the sun gear 44b by rotation of the sun gear 44b.

A ring gear 47 formed of a synthetic resin material is arranged around the planetary gears 46. The ring gear 47 in an annular shape engages with the planetary gears 46 on an inner circumferential surface thereof, and engages with the lower body 32 so as to be unrotatable.

A carrier member 48 engages with and connects the planetary gears 46. The carrier member 48 is formed of a synthetic resin material. An output member 49 is connected to a lower end of the carrier member 48. The output member 49 is formed of a metal material, and is connected to the screw member 14. Thus, the carrier member 48 is connected to the screw member 14 via the output member 49.

A planetary gear mechanism YG is formed of the sun gear 44b, the planetary gears 46, the ring gear 47, and the carrier member 48. The carrier member 48 is rotated by revolution of the planetary gears 46, and can speed-reduce rotation of the sun gear 44b to output the speed-reduced rotation to the screw member 14.

A driving force generated by the electric motor 34 is firstly speed-reduced (in first step speed reduction) by engaging the pinion gear 38 with the first wheel gear 42. The driving force is then speed-reduced (in second step speed reduction) by engaging the gear 41b with the second wheel gear 45. The driving force is further speed-reduced (in third step speed reduction) by the planetary gear mechanism YG, and is transmitted to the screw member 14.

According to this embodiment, the driving device 3 has the bracket member 35 fixed on the inner peripheral surface 32b of the lower body 32, the electric motor 34 positioned in the gear body 31 in the radial direction by engaging with the bracket member 35, and the rubber disk 36 arranged between the bottom surface 32d of the lower body 32 and the electric motor 34 and impelling the electric motor 34 toward the bracket member 35 in the direction of the rotation axis φ, so that the electric motor 34 can be fixed in the gear body 31 without being rattled.

The impelling force of the rubber disk 36 acts between the bottom surface 32d of the lower body 32 and the bracket member 35 fixed on the lower body 32, so that no load separating the lower body 32 and the upper body 33 is caused, and the joining force in the joining portion of both can be prevented from lowering.

The bracket member 35 is formed so as to be separated from the electric motor 34. A general-purpose electric motor not having the mounting portion on an outer circumference thereof can thus be used, so that the driving device 3 can be used at low cost.

The electric motor 34 receives the pressing force from the rubber disk 36. Vibration at driving the vehicle can thus be absorbed by the rubber disk 36, so that damage to the electric motor 34 can be reduced.

The speed reduction mechanism R includes the pinion gear 38 fixed to the output shaft 34b of the electric motor 34, the pivot pin 39 positioned in the radial direction of the electric motor 34 by engaging with the bracket member 35 and mounted in the gear body 31. The speed reduction mechanism R includes the first wheel gear 42 formed on the pivot pin 39, having more teeth than the pinion gear 38, engaging with the pinion gear 38, and connected to the screw member 14, so that the first wheel gear 42 transmits the rotation of the electric motor 34 while reducing the speed thereof to the screw member 14. So that both the electric motor 34 and the pivot pin 39 are positioned on the bracket member 35, and variation in the dimension of the output shaft 34b of the electric motor 34 and the pivot pin 39 depends only on the manufacturing error in the bracket member 35. Thus, variation in the dimension between both can be reduced, and abnormal sound and lowering of the transmission efficiency in operating the speed reduction mechanism R can be prevented.

In addition, the dimension accuracy between the output shaft 34b of the electric motor 34 and the pivot pin 39 can be improved, so that backlash adjustment between the pinion gear 38 and the first wheel gear 42 in manufacturing the speed reduction mechanism R can be unnecessary.

The bracket member 35 is arranged so as to face the upper end surface 34a1 of the motor housing 34a and has the supporting hole 35c. The supporting hole 35c is fitted to an outer circumferential surface of the shaft projection 34a2 from which the output shaft 34b of the electric motor 34 projects. The electric motor 34 is positioned relative to the bracket member 35 in the radial direction. Thus, the position accuracy of the output shaft 34b relative to the pivot pin 39 can be more improved on the bracket member 35, and variation in dimension between both can be further reduced.

In addition, the rubber disk 36 impels the lower end surface 34a6 of the motor housing 34a toward the bracket member 35 to make the upper end surface 34a1 of the motor housing 34a abut on the bracket member 35. Thus, the electric motor 34 can be mounted in the gear body 31 more stably.

The disk holder 34a7 projects from the lower end surface 34a6 of the motor housing 34a, the rubber disk 36 is formed of a rubber material in a disk shape having the motor engaging hole 36a at the center thereof, and is arranged between the bottom surface 32d of the lower body 32 and the lower end surface 34a6 so that the disk holder 34a7 is fitted in the motor engaging hole 36a. Thus, the rubber disk 36 can be prevented from being misaligned in the gear body 31, and the electric motor 34 can be stably impelled toward the bracket member 35.

The speed reduction mechanism R includes the gear 41b provided on the pivot pin 39 and rotated integrally with the first wheel gear 42, the gear shaft 44 mounted in the gear body 31. The speed reduction mechanism R includes the second wheel gear 45 formed on the gear shaft 44, having more teeth than the gear 41b, and engaging with the gear 41b. The speed reduction mechanism R includes the sun gear 44b provided on the gear shaft 44 and rotated integrally with the second wheel gear 45, and the plurality of planetary gears 46 engaging with the sun gear 44b and revolving around the outer circumference of the sun gear 44b by rotation of the sun gear 44b. The speed reduction mechanism R includes the ring gear 47 arranged around the planetary gears 46, engaging with the planetary gears 46 on the inner circumferential surface thereof, and being unrotatable by engaging with the gear body 31. The speed reduction mechanism R includes the carrier member 48 connecting the planetary gears 46, connected to the screw member 14, and rotated by revolution of the planetary gears 46, so that the carrier member 48 transmits the rotation of the sun gear 44b while reducing the speed thereof to the screw member 14. Thus, the rotation of the electric motor 34 is speed-reduced by the two-stage gear mechanism and the planetary gear mechanism YG, and the electric parking brake driving device 3 can be compact and have a great speed reduction effect.

Other Embodiments

The present invention is not limited to the above embodiment, and can be modified or extended as follows.

The bracket member 35 may be fixed to the motor housing 34a before being mounted on the lower body 32, or may be integrated with the motor housing 34a.

The bracket member 35 may be mounted on the lower body 32 while fitting the pin holding hole 35k of the bracket member 35 to the pivot pin 39 fixed to the lower body 32 or the upper body 33.

In place of the pivot pin 39, a shaft may be rotatably mounted in the gear body 31 via a bearing, and the first wheel gear 42 and the gear 41b may be formed on the shaft.

In place of the rubber disk 36, a plate spring formed of a metal material or a coil spring formed of a metal wire may be used.

The present invention is applicable, not only to the floating type disk brake which sandwichably presses the disk rotor 9 by the pawls 13a of the brake housing 13 and the piston 20 via the brake pads 22a, 22b, but also to a facing type disk brake which presses both side surfaces of the disk rotor 9 by individual pistons.

All motors, such as a synchronous motor, an induction motor, and a DC motor, can be used as the electric motor 34.

REFERENCE SIGNS LIST

In the drawing, the reference numeral 1 denotes a parking brake actuator, the reference numeral 3 denotes an electric parking brake driving device, the reference numeral 9 denotes a disk rotor (disk), the reference numeral 13 denotes a brake housing, the reference numeral 14 denotes a screw member (a rotating member), the reference numeral 19 denotes a nut member (a moving member), the reference numeral 20 denotes a piston (a moving member), the reference numeral 22a denotes a first brake pad (a brake pad), the reference numeral 22b denotes a second brake pad (a brake pad), the reference numeral 31 denotes a gear body, the reference numeral 32 denotes a lower body (a first piece), the reference numeral 32b denotes an inner peripheral surface (an inner periphery), the reference numeral 32d denotes a bottom surface (an inner peripheral surface), the reference numeral 33 denotes an upper body (a second piece), the reference numeral 34 denotes an electric motor, the reference numeral 34a denotes a motor housing, the reference numeral 34a1 denotes an upper end surface (one end surface), the reference numeral 34a2 denotes a shaft projection (a fitting portion), the reference numeral 34a3 denotes a projecting end surface, the reference numeral 34a6 denotes a lower end surface (an other end surface), the reference numeral 34a7 denotes a disk holder (an elastic body holding portion), the reference numeral 34b denotes an output shaft (an output shaft), the reference numeral 35 denotes a bracket member (a mounting member), the reference numeral 35c denotes a supporting hole (a positioning hole), the reference numeral 36 denotes a rubber disk (a pressing member), the reference numeral 36a denotes a motor fitting hole (a holding hole), the reference numeral 38 denotes a pinion gear (a driving gear), the reference numeral 39 denotes a pivot pin (a first gear shaft), the reference numeral 41b denotes a gear (a transmission gear), the reference numeral 42 denotes a first wheel gear (a first driven gear), the reference numeral 44 denotes a gear shaft (a second gear shaft), the reference numeral 44b denotes a sun gear (a sun gear), the reference numeral 45 denotes a second wheel gear (a second driven gear), the reference numeral 46 denotes a planetary gear, the reference numeral 47 denotes a ring gear, the reference numeral 48 denotes a carrier member, the reference numeral N denotes a knuckle arm (a vehicle body), the reference numeral P denotes an electric parking brake device, the reference numeral R denotes a speed reduction mechanism, and the reference numeral W denotes a wheel.

The invention claimed is:

1. An electric parking brake driving device for driving a parking brake actuator in which rotation motion of a rotating member is converted to linear motion, the linear motion is transmitted to a moving member and a brake pad impelled by the moving member presses a disk rotated together with a wheel to generate a braking force on the wheel, the device comprising:
   a gear body formed by a first piece and a second piece joined to one another in a liquid-tight manner;
   a mounting member fixed directly on an inner periphery of the first piece;
   an electric motor positioned in the gear body in a predetermined direction and being fixed with the mounting member which is formed as a separate piece from the electric motor;
   a pressing member arranged between an inner peripheral surface of the first piece and the electric motor and impelling the electric motor toward the mounting member;
   a speed reduction mechanism housed in the gear body and transmitting a driving force generated by the electric motor to the rotating member;
   wherein the speed reduction mechanism includes:
   a driving gear fixed to an output shaft of the electric motor;
   a first gear shaft positioned in the predetermined direction, the first gear shaft engaging with the mounting member and including an end positioned in a hole in the first piece of the gear body; and
   a first driven gear formed on the first gear shaft, having more teeth than the driving gear, engaging with the driving gear, and connected to the rotating member, so that the first driven gear transmits the rotation of the electric motor while reducing the speed thereof to the rotating member.

2. The electric parking brake driving device according to claim 1,
   wherein the electric motor has a motor housing, a fitting portion projecting from one end surface of the motor housing in the direction of the rotation axis, the output shaft projecting in the axial direction from a projecting end surface of the fitting portion,
   wherein the mounting member is arranged so as to face the one end surface of the motor housing and has a positioning hole, the positioning hole being fitted to an outer circumferential surface of the fitting portion, so that the electric motor being positioned relative to the mounting member in a radial direction,
   wherein the pressing member impels an other end surface of the motor housing toward the mounting member to make the one end surface abut on the mounting member.

3. The electric parking brake driving device according to claim 2,
   wherein an elastic body holding portion projects from the other end surface of the motor housing,
   wherein the pressing member is formed of a rubber material in a disk shape having a holding hole at a center thereof, and is arranged between the inner peripheral surface of the first piece and the other end surface of the motor housing so that the elastic body holding portion is fitted in the holding hole.

4. The electric parking brake driving device according to claim 1,
   wherein the speed reduction mechanism comprising:
   a transmission gear provided on the first gear shaft and rotated integrally with the first driven gear;
   a second gear shaft mounted in the gear body;
   a second driven gear formed on the second gear shaft, having more teeth than the transmission gear, and engaging with the transmission gear;
   a sun gear provided on the second gear shaft and rotated integrally with the second driven gear;
   a plurality of planetary gears engaging with the sun gear and revolving around an outer circumference of the sun gear by rotation of the sun gear;

a ring gear arranged around the planetary gears, engaging with the planetary gears on an inner circumferential surface thereof, and being unrotatable by engaging with the gear body; and a carrier member connecting the planetary gears, connected to the rotating member, and rotated by revolution of the planetary gears, so that the carrier member transmits the rotation of the sun gear while reducing the speed thereof to the rotating member.

5. The electric parking brake driving device according to claim 4, further comprising a bearing fixing surface extending from a wall of the first piece of the gear body toward a center of rotation of the second gear, the bearing fixing surface supporting a bearing, the second gear shaft being rotatably supported by the bearing.

6. The electric parking brake driving device according to claim 5, wherein:

the electric motor includes a motor housing and a fitting portion, the motor housing possessing one end surface at one axial end of the motor housing and an other end surface at an opposite axial end of the motor housing;

the fitting portion projects from the one end surface of the motor housing in the direction of the rotation axis, the fitting portion possessing an end surface facing axially away from the motor housing and an outer circumferential surface, the output shaft projecting in the axial direction beyond the end surface of the fitting portion, the mounting member faces the one end surface of the motor housing and including a positioning hole, the outer circumferential surface of the fitting portion being located in the positioning hole to position the electric motor relative to the mounting member in a radial direction; and the pressing member contacts the other end surface of the motor housing and impelling the motor housing toward the mounting member to abut the one end surface of the motor housing on the mounting member.

7. The electric parking brake driving device according to claim 6, further comprising an elastic body holding portion projecting from the other end surface of the motor housing, the pressing member being comprised of a disk-shaped rubber material and including a holding hole at a center of the disk-shaped rubber material, the disk-shaped rubber material being arranged between an inner peripheral surface of the first piece of the gear body and the other end surface of the motor housing, and the elastic body holding portion being positioned in the holding hole of the disk-shaped rubber material.

8. The electric parking brake driving device according to claim 1, wherein the first gear shaft includes an other end opposite the end of the first gear shaft that is positioned in the hole in the first piece of the gear body, the first gear shaft being fixed in a hole in the mounting member, and the other end of the first gear shaft being fitted in a hole in the second piece of the gear body.

9. The electric parking brake driving device according to claim 8, wherein the end of the first gear shaft that is positioned in the hole in the first piece of the gear body is press-fitted or insert-molded to the first piece of the gear body, and the other end of the first gear shaft that is fitted in the hole in the second piece of the gear body is press-fitted or insert-molded to the second piece of the gear body.

10. An electric parking brake device comprising:
a brake housing mounted on a vehicle body;
a moving member mounted in the brake housing so as to be movable in the axial direction and to be unrotatable;
a brake pad arranged between a disk rotated together with a wheel and the moving member;
a gear body formed by a first piece and a second piece joined to one another in a liquid-tight manner, the gear body being mounted to the brake housing;
an electric motor mounted in the gear body;
a speed reduction mechanism housed in the gear body and transmitting a driving force generated by the electric motor; and
a rotating member engaging with the moving member, driven by the electric motor via the speed reduction mechanism to move the moving member in the axial direction, and impelling the brake pad toward the disk via the moving member, wherein a mounting member is fixed directly on an inner periphery of the first piece, wherein the electric motor is positioned in the gear body in a predetermined direction by being fixed with the mounting member which is formed as a separate piece from the electric motor, wherein a pressing member is arranged between an inner peripheral surface of the first piece and the electric motor, and impels the electric motor toward the mounting member;

wherein the speed reduction mechanism includes:
a driving gear fixed to an output shaft of the electric motor;
a first gear shaft positioned in the predetermined direction, the first gear shaft engaging with the mounting member and including an end positioned in a hole in the first piece of the gear body; and
a first driven gear formed on the first gear shaft, having more teeth than the driving gear, engaging with the driving gear, and connected to the rotating member, so that the first driven gear transmits the rotation of the electric motor while reducing the speed thereof to the rotating member.

11. The electric parking brake driving device according to claim 10,
wherein the speed reduction mechanism comprises:
a transmission gear provided on the first gear shaft and integrally rotatable with the first driven gear;
a second gear shaft rotatably supported on a bearing that is fixed to the first piece of the gear body;
a second driven gear formed on the second gear shaft, having more teeth than the transmission gear, and engaging with the transmission gear;
a sun gear provided on the second gear shaft and integrally rotatable with the second driven gear;
a plurality of planetary gears engaging with the sun gear and revolving around an outer circumference of the sun gear by rotation of the sun gear;
a ring gear arranged around the planetary gears, engaging with the planetary gears on an inner circumferential surface thereof, and being unrotatable by engaging with the gear body; and
a carrier member connecting the planetary gears, connected to the rotating member, and rotated by revolution of the planetary gears, so that the carrier member transmits the rotation of the sun gear while reducing the speed of the sun gear to the rotating member.

12. The electric parking brake driving device according to claim 11, further comprising a bearing fixing surface extending from a wall of the first piece of the gear body toward a center of rotation of the second gear, the bearing fixing surface supporting a bearing, the second gear shaft being rotatably supported by the bearing.

13. An electric parking brake driving device for driving a parking brake actuator in which rotation motion of a rotating member is converted to linear motion, the linear motion is transmitted to a moving member and a brake pad impelled by the moving member presses a disk rotated together with a wheel to generate a braking force on the wheel, the device comprising:
- a gear body formed by a first piece and a second piece joined to one another in a liquid-tight manner;
- a mounting member fixed directly on an inner periphery of the first piece;
- an electric motor positioned in the gear body in a predetermined direction by engaging or being integrated with the mounting member;
- a pressing member arranged between an inner peripheral surface of the first piece and the electric motor and impelling the electric motor toward the mounting member; and
- a speed reduction mechanism housed in the gear body and transmitting a driving force generated by the electric motor to the rotating member,
- wherein the speed reduction mechanism includes:
- a driving gear fixed to an output shaft of the electric motor;
- a first gear shaft positioned in the predetermined direction by engaging with the mounting member and mounted in the gear body;
- a first driven gear formed on the first gear shaft, having more teeth than the driving gear, engaging with the driving gear, and connected to the rotating member, so that the first driven gear transmits the rotation of the electric motor while reducing the speed thereof to the rotating member;
- a transmission gear provided on the first gear shaft and rotated integrally with the first driven gear;
- a second gear shaft rotatably supported on a bearing that is fixed to the first piece of the gear body;
- a second driven gear formed on the second gear shaft, having more teeth than the transmission gear, and engaging with the transmission gear;
- a sun gear provided on the second gear shaft and rotated integrally with the second driven gear;
- a plurality of planetary gears engaging with the sun gear and revolving around an outer circumference of the sun gear by rotation of the sun gear;
- a ring gear arranged around the planetary gears, engaging with the planetary gears on an inner circumferential surface thereof, and being unrotatable by engaging with the gear body; and
- a carrier member connecting the planetary gears, connected to the rotating member, and rotated by revolution of the planetary gears, so that the carrier member transmits the rotation of the sun gear while reducing the speed thereof to the rotating member,
- wherein the mounting member is formed as a separate piece from the electric motor and the ring gear.

14. The electric parking brake driving device according to claim 13,
- wherein the electric motor has a motor housing, a fitting portion projecting from one end surface of the motor housing in the direction of the rotation axis, the output shaft projecting in the axial direction from a projecting end surface of the fitting portion,
- wherein the mounting member is arranged so as to face the one end surface of the motor housing and has a positioning hole, the positioning hole being fitted to an outer circumferential surface of the fitting portion, so that the electric motor being positioned relative to the mounting member in a radial direction,
- wherein the pressing member impels an other end surface of the motor housing toward the mounting member to make the one end surface abut on the mounting member.

15. The electric parking brake driving device according to claim 14,
- wherein an elastic body holding portion projects from the other end surface of the motor housing,
- wherein the pressing member is formed of a rubber material in a disk shape having a holding hole at a center thereof, and is arranged between the inner peripheral surface of the first piece and the other end surface of the motor housing so that the elastic body holding portion is fitted in the holding hole.

16. The electric parking brake driving device according to claim 13, further comprising a bearing fixing surface extending from a wall of the first piece of the gear body toward a center of rotation of the second gear, the bearing fixing surface supporting a bearing, the second gear shaft being rotatably supported by the bearing.

17. The electric parking brake driving device according to claim 16, wherein:
- the electric motor includes a motor housing and a fitting portion, the motor housing possessing one end surface at one axial end of the motor housing and an other end surface at an opposite axial end of the motor housing;
- the fitting portion projects from the one end surface of the motor housing in the direction of the rotation axis, the fitting portion possessing an end surface facing axially away from the motor housing and an outer circumferential surface, the output shaft projecting in the axial direction beyond the end surface of the fitting portion,
- the mounting member faces the one end surface of the motor housing and including a positioning hole, the outer circumferential surface of the fitting portion being located in the positioning hole to position the electric motor relative to the mounting member in a radial direction; and
- the pressing member contacts the other end surface of the motor housing and impelling the motor housing toward the mounting member to abut the one end surface of the motor housing on the mounting member.

18. The electric parking brake driving device according to claim 17, further comprising an elastic body holding portion projecting from the other end surface of the motor housing, the pressing member being comprised of a disk-shaped rubber material and including a holding hole at a center of the disk-shaped rubber material, the disk-shaped rubber material being arranged between an inner peripheral surface of the first piece of the gear body and the other end surface of the motor housing, and the elastic body holding portion being positioned in the holding hole of the disk-shaped rubber material.

19. An electric parking brake device comprising:
- a brake housing mounted on a vehicle body;
- a moving member mounted in the brake housing so as to be movable in the axial direction and to be unrotatable;
- a brake pad arranged between a disk rotated together with a wheel and the moving member;
- a gear body formed by a first piece and a second piece joined to one another in a liquid-tight manner, the gear body being mounted to the brake housing;
- an electric motor mounted in the gear body;

a speed reduction mechanism housed in the gear body and transmitting a driving force generated by the electric motor; and a rotating member engaging with the moving member, driven by the electric motor via the speed reduction mechanism to move the moving member in the axial direction, and impelling the brake pad toward the disk via the mounting member, wherein a mounting member is fixed directly on an inner periphery of the first piece, wherein the electric motor is positioned in the gear body in a predetermined direction by engaging or being integrated with the mounting member, wherein a pressing member is arranged between an inner peripheral surface of the first piece and the electric motor, and impels the electric motor toward the mounting member, wherein the speed reduction mechanism includes:

a driving gear fixed to an output shaft of the electric motor;

a first gear shaft positioned in the predetermined direction, the first gear shaft engaging with the mounting member and including an end positioned in a hole in the first piece of the gear body;

a first driven gear formed on the first gear shaft, having more teeth than the driving gear, engaging with the driving gear, and connected to the rotating member, so that the first driven gear transmits the rotation of the electric motor while reducing the speed thereof to the rotating member;

a transmission gear provided on the first gear shaft and rotated integrally with the first driven gear;

a second gear shaft rotatably supported on a bearing that is fixed to the first piece of the gear body;

a second driven gear formed on the second gear shaft, having more teeth than the transmission gear, and engaging with the transmission gear;

a sun gear provided on the second gear shaft and rotated integrally with the second driven gear;

a plurality of planetary gears engaging with the sun gear and revolving around an outer circumference of the sun gear by rotation of the sun gear;

a ring gear arranged around the planetary gears, engaging with the planetary gears on an inner circumferential surface thereof, and being unrotatable by engaging with the gear body; and a carrier member connecting the planetary gears, connected to the rotating member, and rotated by revolution of the planetary gears, so that the carrier member transmits the rotation of the sun gear while reducing the speed thereof to the rotating member, wherein the mounting member is formed as a separate piece from the electric motor and the ring gear.

20. The electric parking brake driving device according to claim 19, further comprising a bearing fixing surface extending from a wall of the first piece of the gear body toward a center of rotation of the second gear, the bearing fixing surface supporting a bearing, the second gear shaft being rotatably supported by the bearing.

* * * * *